June 28, 1932.  G. M. HAUNGS  1,865,250
SPECIFIC GRAVITY INDICATING MEANS

Filed Dec. 3, 1928

INVENTOR.
George M. Haungs
BY Raymond H. Van Nest
ATTORNEY

Patented June 28, 1932

1,865,250

UNITED STATES PATENT OFFICE

GEORGE M. HAUNGS, OF NIAGARA FALLS, NEW YORK, ASSIGNOR TO U S L BATTERY CORPORATION, OF NIAGARA FALLS, NEW YORK, A CORPORATION OF NEW YORK

SPECIFIC GRAVITY INDICATING MEANS

Application filed December 3, 1928. Serial No. 323,378.

My present invention relates to a specific gravity indicating means, and more particularly to a means adapted to be immersed in the electrolyte of a storage battery to indicate the condition thereof.

Heretofore certain types of storage batteries have been provided with specific gravity indicating means, usually bodies of known densities, immersed in the electrolyte thereof and which sink when the specific gravity of the electrolyte reaches certain predetermined values. These bodies are generally in the form of small balls, known as pilot balls. One of the disadvantages of such an arrangement is that frequently the balls become jammed in the passageway in which they operate and fail to indicate the true condition of the battery.

Another disadvantage is that the pilot balls can be used only with certain types of containers having special provision for their accommodation.

An object of my invention is to provide a storage battery indicating means providing a plurality of pilot balls of different densities, and a housing therefor, in which each ball is isolated from the others, whereby jamming of the balls in the passageway is eliminated. A further object of my invention is to provide a storage battery indicating means adapted to be detachably connected to a battery element, and which may be readily attached as a unit to many types of batteries now in use, no special form of container being required.

Other objects, advantages and features will appear as the description proceeds.

A better understanding of my invention may be had by reference to the accompanying drawing, wherein I have illustrated one form of my invention.

Figure 1:
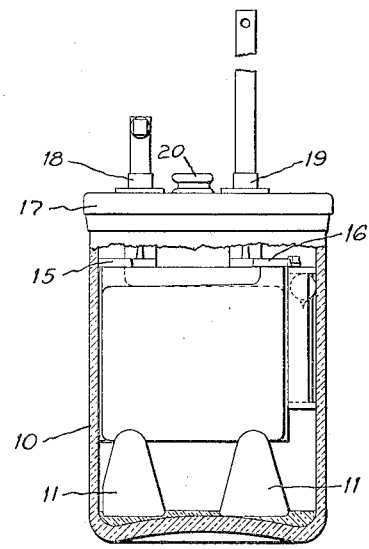
Figure 1 is a side elevation view of a battery embodying one form of my invention, a portion of the side wall being broken away.

Referring to the drawing, reference numeral 10 designates a storage battery jar or casing of glass or other transparent material, within which, and supported on bridges 11 of porcelain or other suitable insulating material, are positive plates 12 and negative plates 13. The plates are arranged alternately in the usual manner and are separated from each other by separators 14. The positive plates are secured to a strap 15 by being burned thereto, or in any other satisfactory manner. Likewise, the negative plates are secured to strap 16. Extending upwardly from straps 15 and 16, and passing through the cover 17 are terminal posts 18 and 19 respectively, whereby the battery may be connected into an external circuit. Access may be had to the interior of the container by removing vent plug 20.

So far, the structure described is a conventional form of storage battery commonly used for farm lighting and other purposes.

According to one form of my invention there is provided a cage or housing 21 comprising top and bottom members 22 and 23 respectively and side walls 24 and 25. A partition 26 divides the member 21 into two elongated compartments extending from the top to the bottom thereof.

Figure 6:
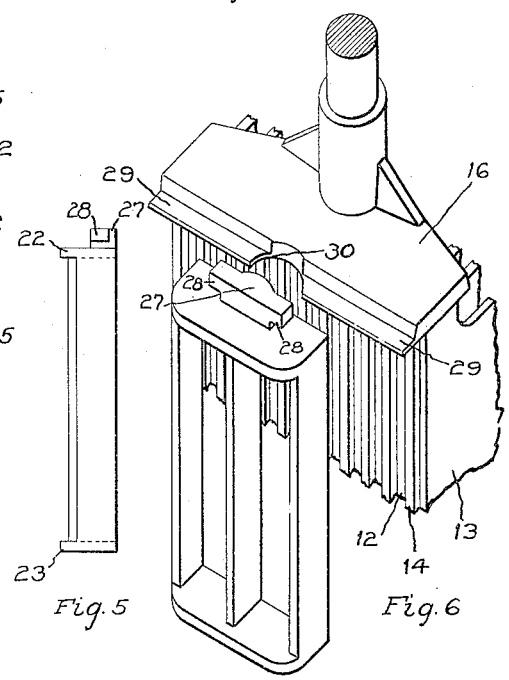
Figure 6 is an isometric fragmentary view showing one manner of securing my invention in the operative position.

As a convenient means for mounting the housing in its operative position, I have provided an extension 27 of semi-circular cross-section which rises vertically from the top member 22. Spaced from the top 22 and formed integrally with member 27 are a pair of lateral extensions 28. As shown in Figure 6, strap 16 is provided with a shelf 29 having a semi-circular recess 30 formed in the front edge thereof. The parts are so proportioned that the member 27 will fit within recess 30, and extensions 28 will overhang shelf 29, thereby holding member 21 in its operative position.

Figure 2:
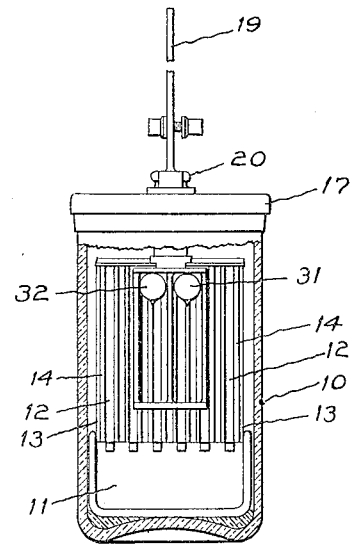
Figure 2 is an end elevational view thereof, partly in section.
Figure 3:
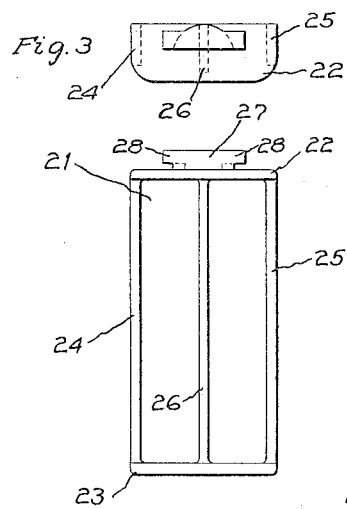
Figures 3, 4 and 5 are top, front and side views respectively of a pilot ball housing.
Figures 4, 5:
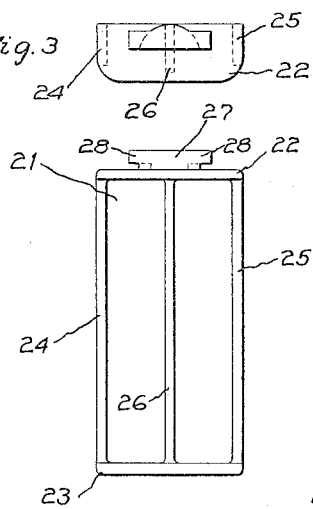

In each of the compartments of member 21 is a pilot ball of known density. In Fig. 2 I have indicated two such balls by numerals 31 and 32. One manner of using my invention is to employ balls of such density that one will serve as a warning signal, dropping to the bottom of member 21 when the battery is about three-fourths discharged and the other will drop when the battery is fully discharged. While I have shown an indicator having but two pilot balls, I do not intend thereby to limit myself to any particular number. Wherever it is desirable to indicate more than two conditions of the battery, member 21 may be provided with additional compartments and balls.

With the housing 21 in the position shown in Figs. 1 and 2, the balls will be completely enclosed within their respective compartments, the battery element and a container wall serving as back and front walls thereof respectively. The housing may be made of such width as to extend from the adjacent container wall to the battery element, thereby assuring retention of the pilot balls within their compartment.

The means for securing my invention in operative position may be varied to suit the battery with which it is intended to be used.

For convenience in claiming the term "battery element" is used to include the assembled groups of positive and negative plates and the separators.

What I claim as new and desire to secure by Letters Patent of the United States, is—

1. In combination, a storage battery casing, a battery element within said casing, said element being provided with a ledge, a housing having top, side and bottom walls interposed between said casing and said battery element, said housing being located wholly within said casing, a member integral with said housing top-wall and extending upwardly therefrom, said member having laterally extending portions adapted to overhang portions of said ledge whereby said housing is detachably supported by said ledge.

2. In combination, a storage battery element having a laterally projecting portion overhanging the plate groups of said element, and a specific gravity indicating means having spaced portions adapted to receive therebetween the laterally projecting portions of said element, whereby said specific gravity indicating means is maintained in a vertical position.

3. In a storage battery, a battery element, a horizontally projecting member extending from said element, and a specific gravity indicator housing having spaced portions adapted to engage opposite surfaces of said horizontally projecting member, whereby said housing is detachably maintained in a substantially vertical position.

4. A battery element comprising a plurality of battery plates, a strap connecting said plates to form a plate group, a ledge integral with said strap and overhanging said plate group, said ledge having a recess formed therein, in combination with specific gravity indicating means comprising a housing, a member secured to said housing and adapted to be received in said recess, said member having laterally extending portions overhanging portions of said ledge, whereby said housing is positively held in a vertical position.

In witness whereof, I have hereunto subscribed my name.

GEORGE M. HAUNGS.